United States Patent
Ell

(10) Patent No.: US 10,837,745 B2
(45) Date of Patent: Nov. 17, 2020

(54) SHORT-EXPOSURE IMAGING-SEEKER FOR SPIN-STABILIZED PROJECTILES

(71) Applicant: Simmonds Precision Products, Inc., Vergennes, VT (US)

(72) Inventor: Todd A. Ell, Savage, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 39 days.

(21) Appl. No.: 16/035,202

(22) Filed: Jul. 13, 2018

(65) Prior Publication Data

US 2020/0018579 A1 Jan. 16, 2020

(51) Int. Cl.
| | |
|---|---|
| F42B 12/36 | (2006.01) |
| G06T 7/73 | (2017.01) |
| F42B 10/06 | (2006.01) |
| H04N 5/232 | (2006.01) |

(52) U.S. Cl.
CPC ............ F42B 12/365 (2013.01); F42B 10/06 (2013.01); G06T 7/74 (2017.01); H04N 5/23267 (2013.01)

(58) Field of Classification Search
CPC .......... F42B 12/365; F42B 10/06; G06T 7/74; H04N 5/23267
USPC ........................................................ 348/117
See application file for complete search history.

(56) References Cited

U.S. PATENT DOCUMENTS

| | | | |
|---|---|---|---|
| 4,537,370 A | 8/1985 | Pizzurro | |
| 5,669,581 A * | 9/1997 | Ringer | F41G 7/222 244/3.16 |
| 6,711,293 B1 | 3/2004 | Lowe | |
| 2012/0211590 A1* | 8/2012 | Mccool | F42B 10/025 244/3.16 |
| 2015/0362290 A1* | 12/2015 | Ell | F41G 7/008 244/3.16 |
| 2017/0154431 A1* | 6/2017 | Kim | G06K 9/00664 |

FOREIGN PATENT DOCUMENTS

| | | |
|---|---|---|
| EP | 2816310 A2 | 12/2014 |
| EP | 3546879 A1 | 10/2019 |
| GB | 2459914 A | 11/2009 |

(Continued)

OTHER PUBLICATIONS

Bir Bhanu. "Automatic target recognition: State of the art survey". In: *IEEE transactions on aerospace and electronic systems* 4 (1986), pp. 364-379.

(Continued)

*Primary Examiner* — Ayman A Abaza
(74) *Attorney, Agent, or Firm* — Locke Lord LLP; Scott D. Wofsy; Judy R. Naamat

(57) ABSTRACT

A method is provided of generating a course-correction signal for a spin-stabilized projectile. The method includes capturing a time-sequence of images of a scene at a frame rate, comparing respective current images of the time-sequence of images to a corresponding previous image of the time-sequence of images, determining a rotation angle between the current and previous images, rotating the images using the rotation angle, identifying a target in the rotated images, generating target bearing angles to cause the projectile to correct its course toward the target using the target bearing angles, and adjusting the target bearing angles to compensate for the rotation of the images.

11 Claims, 6 Drawing Sheets

(56) References Cited

FOREIGN PATENT DOCUMENTS

| WO | WO-2010068320 | 6/2010 |
| WO | WO-2017072764 A1 | 5/2017 |

OTHER PUBLICATIONS

Felix Krahmer et al. "Blind image deconvolution: Motion blur estimation". In: (2006).

Emanuele Trucco and Konstantinos Plakas. "Video tracking: a concise survey". In: *IEEE Journal of oceanic engineering* 31.2 (2006), pp. 520-529.

João P Oliveira, Mario AT Figueiredo, and José M Bioucas-Dias. "Blind estimation of motion blur parameters for image deconvolution". In: (2007). pp. 604-611.

Qi Shan, Wei Xiong, and Jiaya Jia. "Rotational motion deblurring of a rigid object from a single image". In: (2007), pp. 1-8.

Shengyang Dai and Ying Wu. "Motion from blur". In: (2008), pp. 1-8.

Qi Shan, Jiaya Jia. and Aseem Agarwala. "High-quality motion deblurring from a single image". In: 27.3 (2008), p. 73.

Anat Levin et al. "Understanding and evaluating blind deconvolution algorithms". In: (2009), pp. 1964-1971.

Michael Hirsch et al. "Efficient filter flow for space-variant multiframe blind deconvolution". In: (2010), pp. 607-614.

Neel Joshi el al. "Image deblurring using inertial measurement sensors". In: 29.4 (2010), p. 30.

Guoshen Yu and Jean-Michel Morel. "ASIFT: An algorithm for fully affine invariant comparison". In: *Image Processing on Line 1* (2011). pp. 11-38.

Shah Rez Khan, Martin Feldman, and Bahadir K Gunturk. "Extracting sub-exposure images from a single capture through Fourier-based optical modulation". In *Signal Processing: Image Communication* 6o (2018), pp. 107-115.

Extended European Search Report for European Patent Application No. EP19186380.2, dated Nov. 11, 2019.

\* cited by examiner

SHORT-EXPOSURE IMAGING-SEEKER FOR SPIN-STABILIZED PROJECTILES

BACKGROUND OF THE INVENTION

1. Field of the Invention

The present disclosure relates to image sensing during projectile flight, and more particularly, to image input for flight control of a spin-stabilized projectile.

2. Description of Related Art

Projectile flight is often stabilized by a high spin rate. Spin stabilized artillery munitions were originally designed to provide precise ballistic fire on long-range stationary targets. However, in today's military operations, many targets can be relocatable, moving, or both. In order to accommodate such dynamic targets, munitions are sometimes provided with terminal-homing seekers having imaging-seekers and flight control mechanisms to autonomously track and home in on the target. The high spin rate of spin-stabilized munitions complicates the tracking and homing process. For example, the high spin rate can interfere with acquisition of clear images by imaging-seekers that have long exposure times suitable for use with low ambient conditions. Additionally, imaging-seekers can be physically affected or damaged by the high spin rate and shocks incurred during munition launch. For example, gimbaled seekers that pivot for stabilizing captured images against high spin rates can be prone to failure when subjected to munition launch.

While conventional methods and systems have generally been considered satisfactory for their intended purpose, there is still a need in the art for reliable image seeking systems and methods for a spin-stabilized projectile that can support terminal homing guidance of the projectile.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is an imaging-seeker for a spin-stabilized projectile that spins about a longitudinal axis of the projectile is provided. The imaging-seeker includes a forward-looking imager configured to capture a time-sequence of images of a scene, the imager capturing the images at a frame rate, an image correlation component, a shutter control component that controls the frame rate of the imager based on the rotation angle, an image processor configured to identify a target in images of the time-sequence of images, and a signal generator configured to generate target bearing angles to cause the projectile to correct its course toward the target using the target bearing angles.

The image correlation component is configured to compare respective current images of the time-sequence of images to a corresponding previous image of the time-sequence of images and determine a rotation angle between the current and previous image. The shutter control component is configured to control the frame rate of the imager based on the rotation angle. The image processor is configured to identify a target in images of the time-sequence of images. The signal generator is configured to generate target bearing angles to cause the projectile to correct its course toward the target using the target bearing angles.

In another aspect, a method of generating a course-correction signal for a spin-stabilized projectile is provided. The method includes capturing a time-sequence of images of a scene at a frame rate, comparing respective current images of the time-sequence of images to a corresponding previous image of the time-sequence of images, determining a rotation angle between the current and previous images, rotating the images using the rotation angle, identifying a target in the rotated images, generating target bearing angles to cause the projectile to correct its course toward the target using the target bearing angles, and adjusting the target bearing angles to compensate for the rotation of the images.

In a further aspect, a spin-stabilized projectile is provided that spins about a longitudinal axis of the projectile and further includes the imaging seeker.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
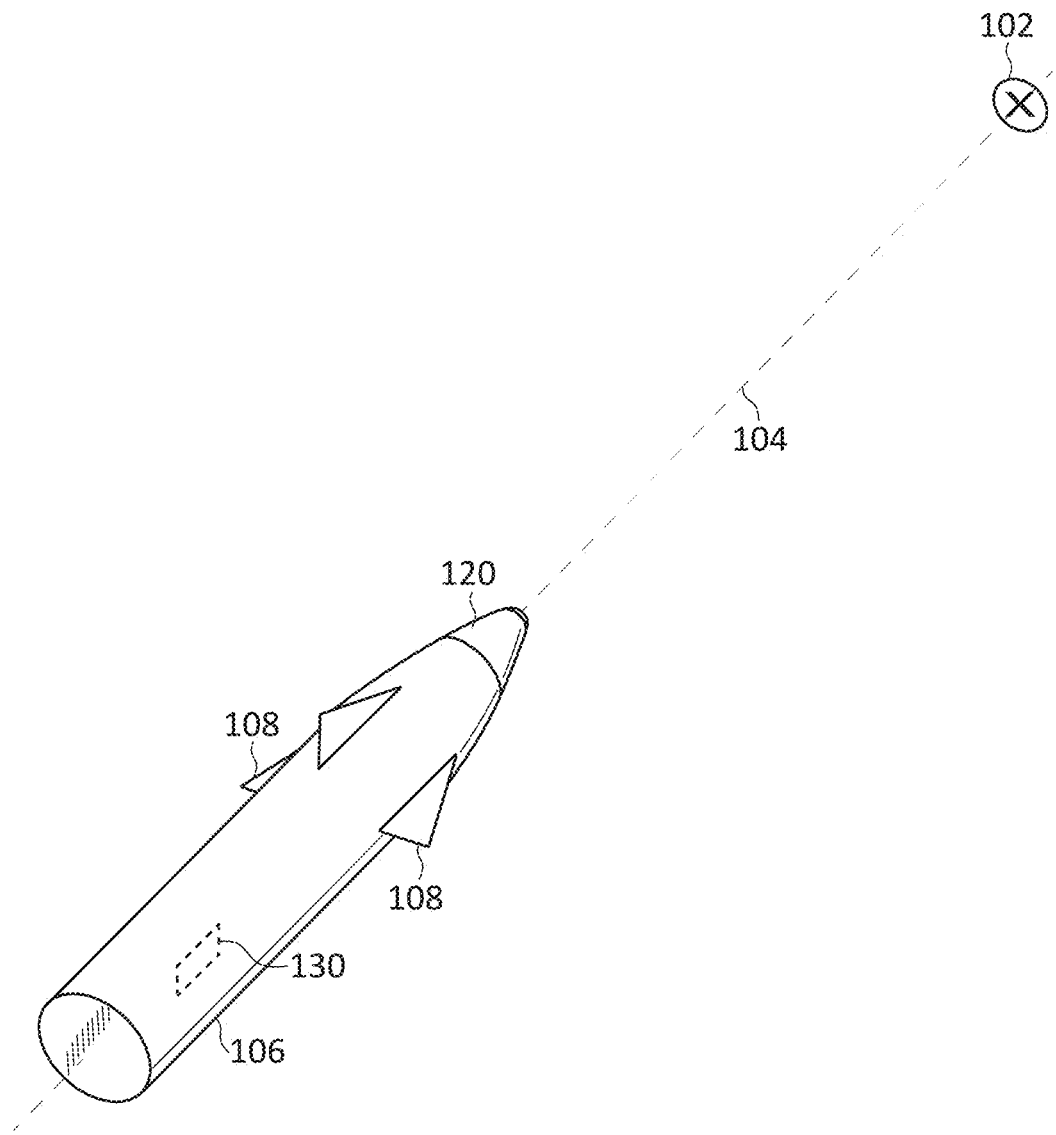
FIG. 1 is a schematic view of an exemplary embodiment of a spin-stabilized projectile in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a projectile in accordance with the disclosure is shown in FIG. 1 and is designated generally by reference character 100. Methods associated with terminal homing guidance operations of the projectile 100 in accordance with the disclosure, or aspects thereof, are provided in FIGS. 2-6, as will be described. The systems and methods described herein can be used to provide improved homing seeking by a spin-stabilized projectile.

Projectile 100 is configured to be launched, such as from a portable or stationary rifled cannon (not shown) toward a target 102. The projectile 100 is launched in a manner that causes the projectile 100 to be rifled for spin-stabilizing the projectile 100 as it is guided towards target 102. The spin-stabilization is achieved by rotating the projectile 100 about a longitudinal axis 104 at a rotational frequency of ωp. The projectile 100 includes a housing 106, flight control members 108, and an imaging-seeker 120.

The imaging-seeker 120 is strapped-down, meaning it is secured in a fixed relationship with respect to the housing 106. In the example shown, the imaging-seeker 120 forms a nose portion of the projectile 100. The imaging-seeker 120 can be fixedly mounted to the housing 106 or housed within the housing 106. The imaging-seeker 120 spins at the same rate ωp as the projectile 100, capturing time-sequenced images as it spins. The imaging-seeker 120 can use short wave infrared (SWIR) imaging to capture the images, which enables image capture using short exposure times. The captured images are processed to determine a rotation angle between consecutive images or consecutive sampled images. The rotation angle is used in a feedback loop to control a shutter of the imager seeker 120 for controlling the exposure time and/or frame rate for capturing the images. The captured images, or sampled captured images, can be further processed and used in an open loop to output target homing information to a flight controller 130. The flight controller can use the output target homing information to control the flight control members 108. The flight control members 108 can be mounted, for example, to the housing 106 and configured to control the flight path of the projectile 100 toward the target 102 for providing terminal guidance of the projectile 100 towards the target 102. The target homing information can be provided, for example, in the form of horizontal and vertical bearing angles, which describe an angle with respect to the housing 106 of the projectile 100 at which the projectile is directed to bear.

Figure 2:
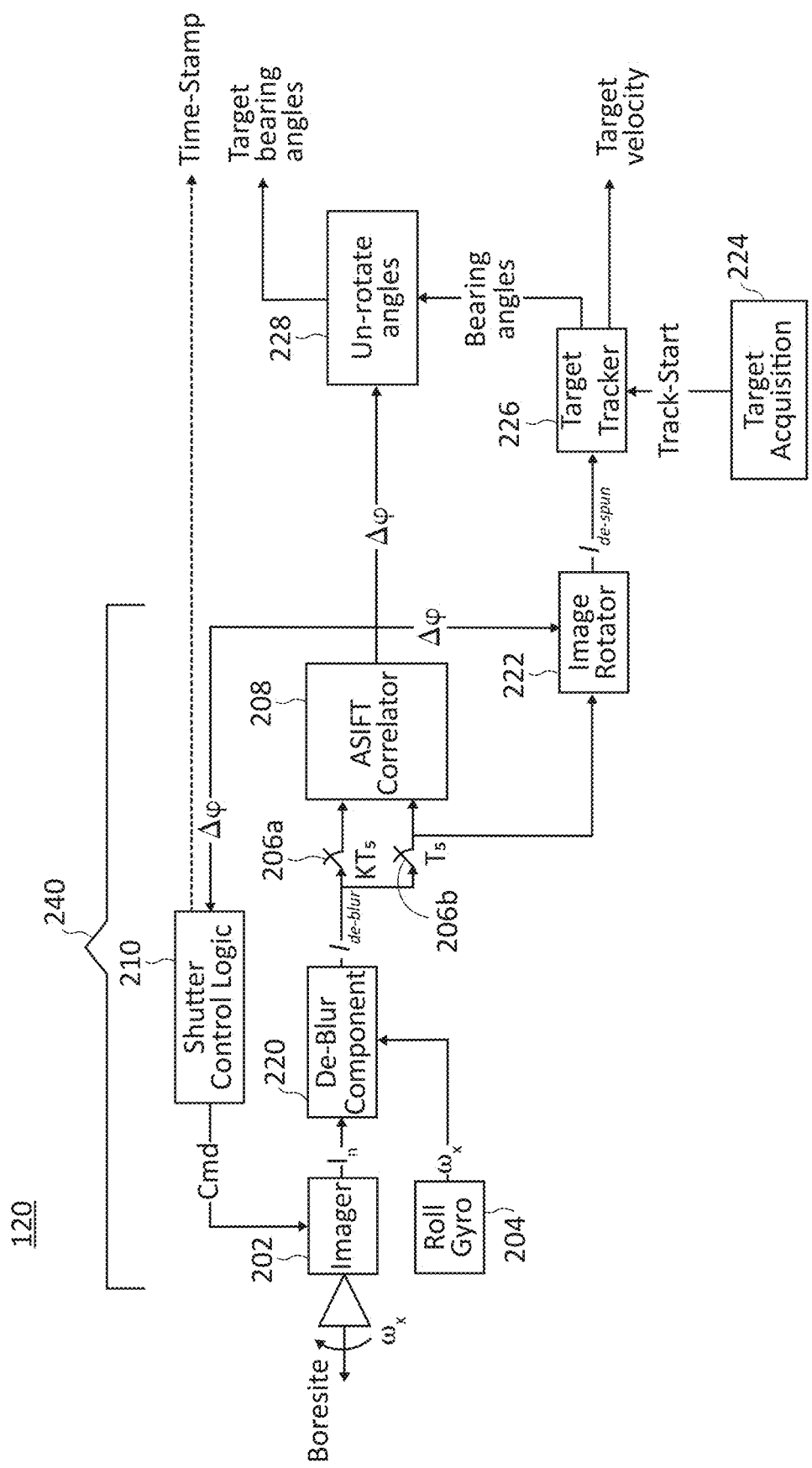
FIG. 2 is a block diagram of an exemplary imaging-seeker of the spin-stabilized projectile in accordance with embodiments of the disclosure.

FIG. 2 shows a schematic diagram of exemplary embodiments of the imaging-seeker 120. Imaging-seeker 120 includes an imager 202, a roll gyro 204, samplers 206, an Affine Scale-Invariant Feature Transform (ASIFT) correlator 208, shutter control logic component 210, a de-blur component 220, an image rotator 222, a target acquisition component 224, a target tracker 226, and an un-rotate angle component 228.

A bore-site of the imager 202 is aligned with longitudinal axis 104 of the projectile 100, wherein the longitudinal axis 104 is the spin axis of the projectile 100. Co-aligned with longitudinal axis 104 is the roll gyro 204. The roll gyro 204 is a gyroscope that senses instantaneous roll spin rate $\omega_x$ of the projectile 100. The roll gyro 204 outputs the spin rate $\omega_x$ to the de-blur component 220.

The imager 202 is an imager that is able to capture two-dimensional images using a relatively short exposure time and outputs images that have stable features. The imager 202 can operate in the SWIR, MWIR, LWIR and visible ranges provided that the above criteria are met. Imagers that operate in the visible and SWIR ranges primarily sense reflected energy and imagers that operate in the MWIR and LWIR primarily sense emitted energy. Images produced using emitted energy may have fewer and less detailed features, albeit sufficient features, that can be used to for correlation of images. While exposure times may be increased under low ambient lighting conditions, the imager 202 is able to capture images that can be usable by applying techniques for de-blurring by the de-blur component 220. The imager 202 can capture images based on the frame rate, such as 30 images/sec and provide the captured images in time-sequence as $I_n$ to the de-blur component 220.

The de-blur component 220 receives the time-series images $I_n$ from the imager 202 and the spin rate $\omega_x$ from the roll gyro 204, and outputs de-blurred images $I_{de-blur}$. The de-blur component 220 is configured to provide image de-convolution to the time-series images $I_n$ by removing image blur caused by motion of the imager 202 during exposure time windows during capture. The spin rate $\omega_x$ of projectile 100 is the primary motion which causes image blurring, hence blurring can be decreased by the de-blur component 220 based on this spin rate $\omega_x$. Using spin rate $\omega_x$ to perform deconvolution saves a significant computation load relative to de-convolution that is performed blindly when the source of the blurring is unknown.

One or more samplers 206 can sample the de-blurred images $I_{de-blur}$ and provide a first sample every Ts seconds and a second sample every KTs seconds to the ASIFT correlator 208. For example, when K=10 and Ts=1 second, the images sampled at the higher rate (in this example, one second intervals) are compared to a respective corresponding images sampled at the lower rate (in this example, 10 second intervals). Each image sampled at the lower rate corresponds to the immediately preceding (or subsequent) image sampled at the higher rate. The ASIFT correlator 208 can use an image sampled at the lower rate as a reference image to determine a relative rotation angle of the corresponding images sampled at the higher rate.

The ASIFT correlator 208 receives the first and/or second samples of the de-blurred images and compares two consecutive images from one of the first and second samples. The ASIFT correlator 208 determines the relative camera motion (translation, rotation, and/or roll) that occurred to capture overlapping portions of the same scene in the two consecutive images. In the current example, the ASIFT correlator 208 determines a relative roll angle $\Delta_\varphi$ that the imager 102 rolled to capture the two consecutive images.

The shutter control logic component 210 receives the roll angle $\Delta_\varphi$ and controls the shutter of the imager 202 (by command signals Cmd) for controlling exposure duration and frame rate of the imager 202 based on the roll angle $\Delta_\varphi$. Furthermore, the shutter control logic component 210 is configured to provide a discrete time stamp that coincides with a time each image is captured. By adjusting the frame rate based on the roll angle $\Delta_\varphi$, the shutter control logic component 210 can advance or retard timing of the next frame.

In the embodiment shown in FIG. 2, a feedback loop 240 is formed that includes the imager 202, de-blur component 204, ASIFT correlator 208, and shutter control logic component 210. The feedback loop 240 allows the image seeker 120 to adjust (advance or retard) the exposure times use by imager 202 so that $\Delta_\varphi \approx 0$, meaning the background of the scene being imaged is stabilized to have the same orientation with respect to rows and columns used by the imager 202. This also allows the imager frame rate to be an integer division of the projectile spin rate $\omega_x$.

Image rotator 222 receives the roll angle $\Delta_\varphi$ and sampled two-dimensional de-blurred images $I_{de-blur}$. Image rotator 222 rotates pixel values in the sampled de-blurred images $I_{de-blur}$ by the roll angle $\Delta_\varphi$. The rotation can be performed using a geometric transform that maps a pixel position (x1, y1) of respective pixels in an input image of the de-blurred images $I_{de-blur}$ onto a position (x2, y2) in an output image by rotating the pixel position through the roll angle $\Delta_\varphi$ about a pixel location that is aligned with the bore-site and situated at the center of the input image. The image rotator 222 outputs rotated images $I_{de\text{-}spun}$ that ideally appear as if they were captured while the projectile 100 was not spinning.

Over time, the feedback loop 240 may achieve the exposure times and frame rate of the imager 202's shutter being controlled such that the roll angle $\Delta_\varphi \approx 0$. However, over time, the spin rate ωx can decay. The feedback loop 240 can take time to adjust to the decay. Thus, the image rotator 222 can rotate the images it receives to compensate for roll angle $\Delta_\varphi$ detected by the ASIFT correlator 208 whenever the roll angle $\Delta_\varphi\hat{} \approx 0$.

Figure 3:
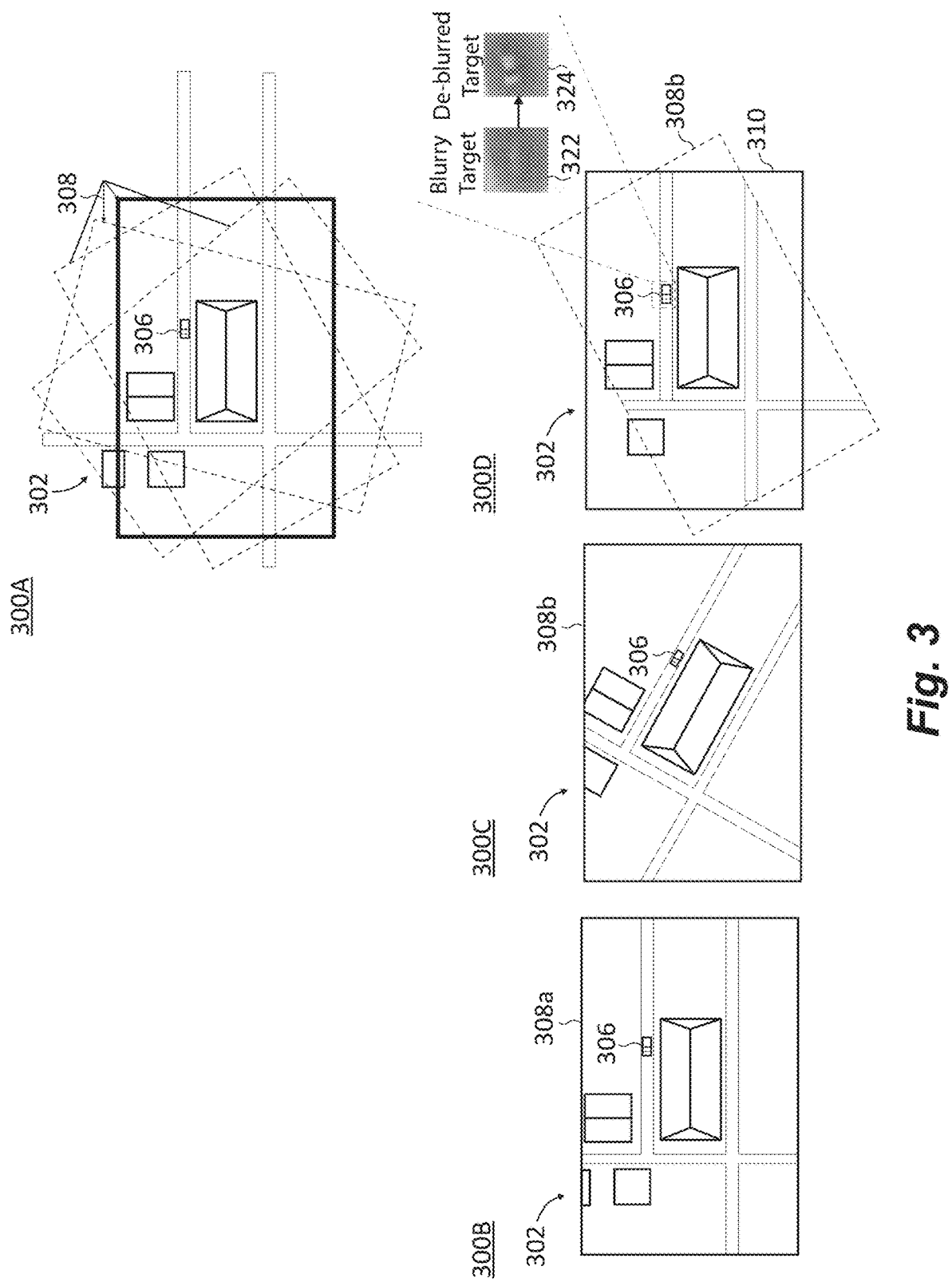
FIG. 3 is schematic diagram of example images acquired of a scene in accordance with embodiments of the disclosure.

With additional reference to FIG. 3, FIG. 3 shows diagrams 300a-300d of a scene 302 having a target 306. In diagram 300a, a series of images 308 captured by imager 202 are shown. The orientations of the different images 308 are effectively random due to the shutter of the imager 202 not being synchronized with the spin rate ωx of the image seeker 120. Eventually, the feedback loop 240 can synchronize the shutter of the imager 202 to an integer multiple of the spin rate ωx, which will cause all the images to be oriented in the same direction.

Diagram 300b shows a sampled image 308a of a portion of the scene 302. Image 308a was captured at a first exposure of the shutter of the imager 202 and sampled by one of samplers 206. Image 308a is provided as a first input image to the ASIFT correlator 208.

Diagram 300c shows a second sampled image 308b of the scene 302. Image 308b was captured a second exposure of the shutter of the imager 202 that occurred after the first exposure, and was sampled by one of samplers 206. Image 308b is provided as a second input to the ASIFT correlator 208. The ASIFT correlator 208 outputs a rotation angle $\Delta_\varphi$ between the first image 308a and the second image 308b.

Diagram 300d shows the second image 308b after being rotated (e.g., using a pixel-wise transform) by the image rotator 222 through the angle $\Delta_\varphi$. The rotation provides alignment of the first image 308a and rotated second image 308b. Alignment means that the direction North, for instance, is the same in each of the first and second images 308b and 308d, making it feasible to track the target 306 in the first image 308b and the rotated second image 308d. Inset 322 shows the imaged target 306 as it appears in a captured image before the de-blurring component 220 de-blurs that image. Inset 324 shows the imaged target 306 after it was de-blurred by the de-blurring component 220, improving the image of the target 306 and the likelihood of the target acquisition component 224 and the target tracker 226 to acquire and track the target 206.

The target acquisition component 224 uses target acquisition algorithms to acquire a target from the rotated images $I_{de\text{-}spun}$, as would be understood by a person skilled in the art. The target acquisition component 224 can consult target templates to acquire the target. Target templates can be stored in a library that can be accessed by the target acquisition component 224, such as target template library 225 shown in FIGS. 4 and 5. The target acquisition component 224 instructs the target tracker 226 when to begin tracking the target by sending a Track-Start signal.

The target tracker 226 tracks the target in the rotated images $I_{de\text{-}spun}$, as would be understood by a person skilled in the art. The target tracker 226 can determine bearing angles that would be used by the flight controller (such as flight controller 130 shown in FIG. 1) to flight control members 108 to steer the projectile 100 toward the tracked target, as would be understood by a person skilled in the art. In addition, the target tracker 226 can determine and output target velocity.

The un-rotate angle component 228 then un-rotates the bearing angles to reverse the effects of the rotation performed by the image rotator 222. For example, the rotation angle can be reversed by mapping pixel positions of the target into an un-rotated position. The un-rotated bearing angles are used for directing the projectile 100 towards the target 306, thus providing terminal homing guidance of the projectile 100.

Figure 4:
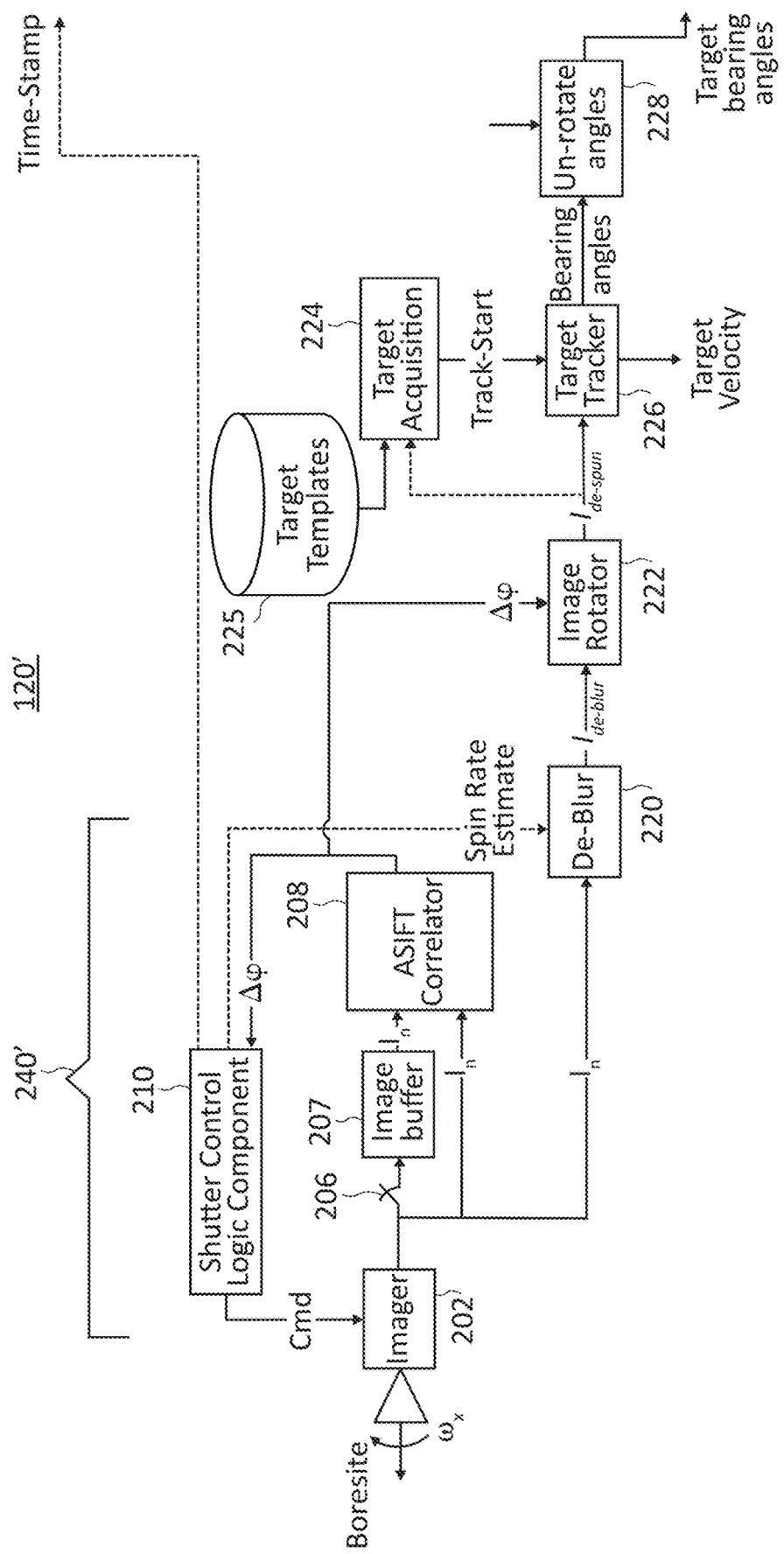
FIG. 4 is a block diagram of further embodiments of an exemplary imaging-seeker of the spin-stabilized projectile in accordance with embodiments of the disclosure.

FIG. 4 shows a schematic diagram of further exemplary embodiments of the imaging-seeker, shown as imaging-seeker 120'. Differences between operations of the components of the imaging-seeker 120' relative components of the imaging-seeker 120 are described. Components and operations of imaging-seekers 120 and 120' for which differences are not described can be configured substantially the same.

Imaging-seeker 120' is shown to include feedback loop 240', wherein the feedback loop 240' includes imager 202, sampler 206 and image buffer 207, ASIFT correlator 208, and shutter control logic 210. The shutter control logic 210 generates uses the roll angles $\Delta_\varphi$ provided by the ASIFT correlator 208 to estimate the spin rate ωp of the projectile 100. The de-blur component 220 is positioned outside of the feedback loop 240 and de-blurs images $I_n$ output by the imager 202 using the estimated spin rate ωp. The de-blur component 220 outputs the de-blurred images $I_{de\text{-}blur}$ to the image rotator 222. Since the de-blur component 220 is outside of the feedback loop 240', the images $I_n$ and $I_m$ received by the ASIFT correlator 208 are not de-blurred. Accordingly, the exposure time of the imager 202 needs to be sufficiently short to minimize blur of images $I_m$ and $I_n$, that are received by the ASIFT correlator 208.

Since the shutter control logic 210 estimates the spin rate ωp of the projectile 100, the roll gyro (not shown in FIG. 4) output is not needed for performing the functions of the imaging-seeker 120' that are shown are described. Accordingly, the imaging-seeker 120' does not require a highly accurate roll gyro. Additionally, the de-blur component can operate on sampled images $I_n$ such that the de-blur process is not performed on every image generated by the imager 202. Since the de-blurring algorithm uses relatively high amounts of computing and power resources, moving the de-blur component 220 outside of the feedback loop 2 can significantly lower the computational load of the imaging-seeker 120'.

Imaging-seeker 120' is shown to include an image buffer 207 and one sampler 206. The ASIFT correlator 208 of imaging-seeker 120' receives first images $I_n$ and second images $I_m$ from the imager 202 and image buffer 207, respectively. First images $I_n$ are received from the imager 202 at the rate that the imager captures the images (e.g., 30 images per second) and second images $I_m$ are received from the image buffer 207 after being sampled at a selected rate, such as one image per 10 seconds. A person skilled in the art will recognize that all sampling rates can be adjusted per design. Implementation in software of samplers 206 and image buffer 207 can be performed in the same or similar ways.

Imaging-seeker 120' is shown to include a target template library 225. One skilled in the art will recognize that imaging-seekers 120 and 120' can use a library and/or logic for performance of target acquisition.

Figure 5:
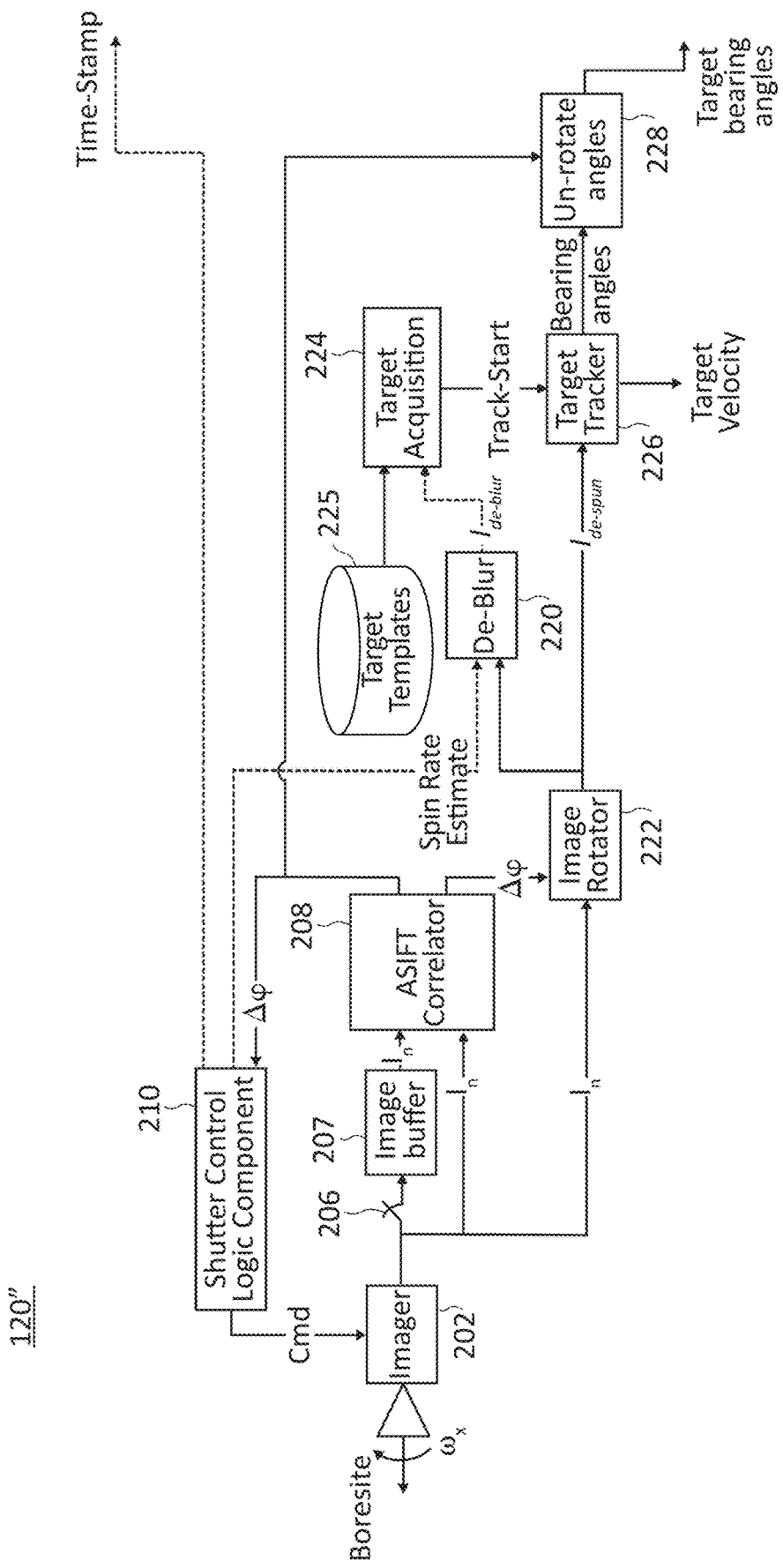
FIG. 5 is a block diagram of additional embodiments of an exemplary imaging-seeker of the spin-stabilized projectile in accordance with embodiments of the disclosure.

FIG. 5 shows a schematic diagram of further exemplary embodiments of the imaging-seeker, shown as imaging-seeker 120". Differences between operations of the components of the imaging-seeker 120" relative to components of the imaging-seeker 120' are described. Components and operations of imaging-seekers 120' and 120" for which differences are not described can be configured substantially the same.

The de-blur component 220 is moved to receive rotated images from the image rotator 222 and to provide the de-blurred images $I_{de-blur}$ to the target acquisition component 228. As in the embodiments shown in FIG. 4, the de-blur component 220 receives the estimated projectile spin rate ωp from the shutter control logic 210. Ideally, the target acquisition component 224 performs target acquisition only once per target. Target acquisition may need to be repeated if the target tracker 226 loses track of the target. Accordingly, the de-blurring may only need to be performed before each target acquisition operation performed by the target acquisition component 224, significantly decreasing the computational load caused by the de-blurring process.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 6:
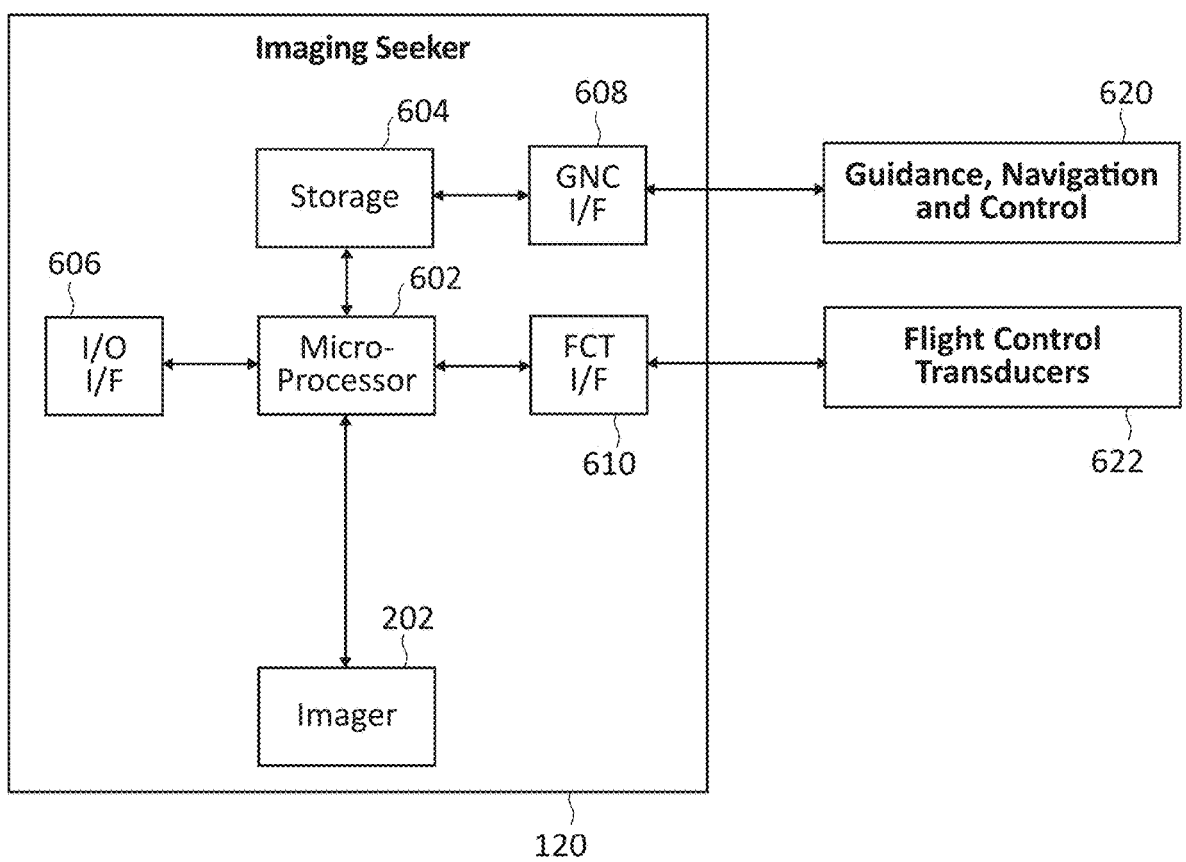
FIG. 6 is a block diagram of an exemplary system configured to generate a course-correction signal for a spin-stabilized projectile.

FIG. 6 is a block diagram of an exemplary system generating a course-correction signal for a spin-stabilized projectile. In FIG. 6, guidance system 600 for spin-stabilized projectile 100 (depicted in FIG. 1) includes imaging-seeker 120, guidance, navigation, and control unit (GNC) 620 and flight control transducer(s) (FCT) 622. Imaging-seeker 120 interfaces with both GNC 620 and FCT(s) 622. In some embodiments, imaging-seeker does not directly interface with FCT(s) 622, but instead indirectly interfaces with FCT(s) 622 via GNC 620. In some embodiments, GNC 620 provides flight telemetry and navigation information to imaging-seeker 120. In various embodiments, imaging-seeker 120 can include more or fewer components.

Imaging-seeker 22 includes processor(s) 602, forward-looking imager 202, storage device(s) 604, GNC interface 608, FCT(s) interface 610, and input/output interface 606. Processor(s) 602 can receive program instructions from storage device(s) 604. Processor(s) 602 can be configured to generate course-correction signals for spin-stabilized projectile 12 based on received program instructions. For example, processor(s) 602 can be configured to receive, from forward-looking imager 202, a time sequence of images. Processor(s) 602 can perform image processing algorithms upon each of the time sequence of images, so as to select a target amongst objects captured within the time sequence of images, and to generate course-correction signals so as to direct spin-stabilized projectile to the selected target.

Processor(s) 602, in some embodiments, can be configured to implement functionality and/or process instructions for execution within imaging-seeker 120. For instance, processor(s) 602 can be capable of processing instructions stored in storage device(s) 604. Examples of processor(s) 602 can include any one or more of a microprocessor, a controller, a digital signal processor(s) (DSP), an application specific integrated circuit (ASIC), a field-programmable gate array (FPGA), or other discrete or integrated logic circuitry having similar processing capabilities.

Storage device(s) 604 can be configured to store information within imaging-seeker 120 during operation. Storage device(s) 604, in some examples, is described as computer-readable storage media. In some examples, a computer-readable storage media can include a non-transitory medium. The term "non-transitory" can indicate that the storage medium is not solely embodied in a carrier wave or a propagated signal. In certain examples, a non-transitory storage medium can store data that can, over time, change (e.g., in RAM or cache). In some examples, storage device(s) 604 is a temporary memory, meaning that a primary purpose of such storage device(s) 604 is not long-term storage. Storage device(s) 604, in some examples, is described as volatile memory, meaning that storage device(s) 604 do not maintain stored contents when power to imaging-seeker 120 is turned off. Examples of volatile memories can include random access memories (RAM), dynamic random access memories (DRAM), static random access memories (SRAM), and other forms of volatile memories. In some examples, storage device(s) 604 is used to store program instructions for execution by processor(s) 602. Storage device(s) 604, in one example, is used by software or applications running on imaging-seeker 120 (e.g., a software program implementing image processing algorithms) to temporarily store information during program execution.

Storage device(s) 604, in some examples, can also include one or more computer-readable storage media. Some storage device(s) 604 can be configured to store larger amounts of information than is sometimes stored in volatile memory. Storage device(s) 604 can further be configured for long-term storage of information. In some examples, storage device(s) 604 include non-volatile storage elements. Examples of such non-volatile storage elements can include magnetic hard discs, optical discs, flash memories, or forms of electrically programmable memories (EPROM) or electrically erasable and programmable (EEPROM) memories.

GNC interface 608 can be used to communicate information between imaging-seeker 120 and GNC 620. In some embodiments, such information can include aircraft conditions, flying conditions, and/or atmospheric conditions. In some embodiments, such information can include data processed by imaging-seeker 120, such as, for example, range data. GNC interface 608 can also include a communications module. GNC interface 608, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the GNC 620 can be performed via a communications bus, such as, for example, an Aeronautical Radio, Incorporated (ARINC) standard communications protocol. In an exemplary embodiment, communication with the GNC 620 can be performed via a communications bus, such as, for example, a Controller Area Network (CAN) bus.

FCT interface 610 can be used to communicate information between imaging-seeker 120 and GNC 620. In some embodiments, such information can include command signals for flight control members and/or feedback signals indicative of actual position of flight control members. FCT interface 610 can also include a communications module. FCT interface 610, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with FNC(s) 622 can be performed via a communications bus, such as, for example, an Aeronautical Radio, Incorporated (ARINC) standard communications protocol. In an exemplary embodiment, aircraft communication with FNC(s) 622 can be performed via a communications bus, such as, for example, a Controller Area Network (CAN) bus.

Input/output interface 606, in some examples, is configured to receive input from a user. Input/output interface 606 can be used to acquire targeting information before spin-stabilized projectile 12 is launched, for example. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus. Input/output interface can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

A potential advantage of the various embodiments of the imaging-seeker disclosed is the ability to provide terminal guidance of spin-stabilized projectile provided with a strapped-down imaging-seeker. The terminal guidance uses images that can provide high precision, even when the target is mobile.

While shown and described in the exemplary context of airborne munitions related applications, those skilled in the art will readily appreciate that the munition 100 in accordance with this disclosure can be used in any other suitable application, including waterborne munitions or for spin-stabilized projectiles aimed at targets for delivery of non-artillery payloads or purposes other than delivery of a payload.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An imaging-seeker for a spin-stabilized projectile that spins about a longitudinal axis of the projectile, the imaging-seeker comprising:
    a forward-looking imager configured to capture a time-sequence of images of a scene, the imager capturing the time-sequence of images at a frame rate;
    an image correlation component configured to:
        compare respective current images of the time-sequence of images to a corresponding previous image of the time-sequence of images; and
        determine a rotation angle between the current and previous images based on the comparison;
    shutter control logic configured to:
        control the frame rate of the imager based on the rotation angle; and
        estimate spin rate of the projectile based on rotation angles determined for iterations of a control loop;
    an image rotator configured to rotate the time-sequence of images using the rotation angle;
    an image processor configured to acquire a target in images of the rotated time-sequence of images;
    a de-blur component configured to minimize blur in at least a portion of the time-sequence images, wherein minimizing the blur uses the estimated spin rate, minimizing the blur is performed before providing the at least a portion of the time-sequence images to the image processor for acquiring the target and only until the target is acquired and when target acquisition is repeated, and minimizing the blur is performed one of before and after rotating the image by the image processor; and
    a signal generator configured to generate target bearing angles to cause the projectile to correct its course toward the target using the target bearing angles.

2. The imaging-seeker as recited in claim 1, wherein the signal generator is configured to adjust the target bearing angles to compensate for the rotation of the time-sequence of images.

3. The imaging-seeker as recited in claim 1, wherein the imaging processor further processes images of the time-sequence of images for tracking the target, wherein the de-blur component is configured to minimize blur in the images after the images are rotated by the image processor, and tracking the target is performed using a second portion of the rotated images that is different than the at least a portion of the rotated images, the second portion of the rotated images having not been processed by the de-blur component for minimizing blur.

4. The imaging-seeker as recited in claim 1, wherein the shutter control logic is configured to adjust the exposure time of the imager for capturing the time-sequence of images to render the rotation angle between images of the time-sequence of images captured by the imager to be equal to about zero.

5. The imaging-seeker as recited in claim 4, wherein the frame rate is controlled to be an integer division of an actual spin rate cop of the projectile.

6. The imaging-seeker as recited in claim 1, wherein the shutter control logic is configured to provide a time stamp that coincides with a time each image is captured.

7. The imaging-seeker as recited in claim 1, wherein the image correlation component uses an affine scale-invariant feature transform (ASIFT) algorithm.

8. A method of generating a course-correction signal for a spin-stabilized projectile, the method comprising:
capturing a time-sequence of images of a scene at a frame rate;
comparing respective current images of the time-sequence of images to a corresponding previous image of the time-sequence of images;
determining a rotation angle between the current and previous images based on the comparison; controlling the frame rate of the imager based on the rotation angle;
estimating spin rate of the projectile based on rotation angles determined for iterations of a control loop;
rotating the time-sequence of images using the rotation angle;
acquiring a target in the rotated time-sequence of images;
minimizing blur in at least a portion of the time-sequence images, wherein minimizing the blur uses the estimated spin rate, minimizing the blur is performed before acquiring the target and only until the target is acquired and when target acquisition is repeated, and minimizing the blur is performed one of before and after rotating the image;
generating target bearing angles to cause the projectile to correct its course toward the target using the target bearing angles; and
adjusting the target bearing angles to compensate for the rotation of the time-sequence of images.

9. The method as recited in claim 8, further comprising controlling the frame rate based on the rotation angle.

10. The method as recited in claim 8, further comprising tracking the target, wherein minimizing blur in the at least a portion of the rotated images is performed after rotating the image, and tracking the target is performed using a second portion of the rotated images that is different than the at least a portion of the rotated images, the second portion of the rotated images having not been operated on by the de-blur component for minimizing blur.

11. A spin-stabilized projectile that spins about a longitudinal axis of the projectile, the spin-stabilized projectile comprising:
an imaging-seeker comprising:
a forward-looking imager configured to capture a time-sequence of images of a scene, the imager capturing the time-sequence of images at a frame rate;
an image correlation component configured to:
receive the time-sequence of images and compare respective current images of the time-sequence of images to a corresponding previous image of the time-sequence of images; and
determine a rotation angle between the current and previous images based on the comparison; and
shutter control logic configured to:
control the frame rate of the imager based on the rotation angle; and
estimate spin rate of the projectile based on rotation angles determined for iterations of a control loop;
an image rotator configured to rotate the time-sequence of images using the rotation angle;
an image processor configured to acquire a target in images of the rotated time-sequence of images;
a de-blur component configured to minimize blur in at least a portion of the time-sequence images, wherein minimizing the blur uses the estimated spin rate, minimizing the blur is performed before providing the at least a portion of the time-sequence images to the image processor for acquiring the target and only until the target is acquired and when target acquisition is repeated, and minimizing the blur is performed one of before and after rotating the image by the image processor; and
a signal generator configured to generate target bearing angles to cause the projectile to correct its course toward the target using the target bearing angles.

* * * * *